(12) United States Patent
Wolf et al.

(10) Patent No.: US 6,906,510 B2
(45) Date of Patent: Jun. 14, 2005

(54) QUADRATURE OUTPUT SENSOR SYSTEM (76) Inventors: Ronald J. Wolf, 51082 Stratford Ct., Elkhart, IN (US) 46514; Max W. Garwood, 450 N. Jefferson St., P.O. Box 30, Huntington, IN (US) 46750

( * ) Notice: Subject to any disclaimer, the term of this patent is extended or adjusted under 35 U.S.C. 154(b) by 0 days.

(21) Appl. No.: 10/714,687

(22) Filed: Nov. 17, 2003

(65) Prior Publication Data

US 2004/0108850 A1 Jun. 10, 2004

Related U.S. Application Data (60) Provisional application No. 60/426,853, filed on Nov. 18, 2002.

(51) Int. Cl.[7] ................................................. G01P 3/44
(52) U.S. Cl. ................................ 324/174; 3234/207.25; 3234/243
(58) Field of Search ...................... 324/207.11–207.19, 324/207.2, 207.21, 207.24, 207.25, 207.26, 242, 243, 174

(56) References Cited

U.S. PATENT DOCUMENTS

2002/0149358 A1 * 10/2002 Doescher ............... 324/207.21
2004/0160220 A1 * 8/2004 Wendt ................... 324/207.21

* cited by examiner

Primary Examiner—Bot LeDynh (57) ABSTRACT

A sensor system including a sensor having at least one magnet and a plurality of magnetic flux responsive devices fixedly adjacent to the at least one magnet. Each of the plurality of magnetic flux responsive devices have a primary sensing plane, at least two of the primary sensing planes being offset from each other. A quadrature normalization circuit is communicatively connected to the sensor.

16 Claims, 7 Drawing Sheets

QUADRATURE OUTPUT SENSOR SYSTEM

CROSS-REFERENCE TO RELATED APPLICATIONS

This is a non-provisional patent application based upon U.S. Provisional Patent application, Ser. No. 60/426,853 bearing the title "Quadrature Output Sensor" filed on Nov. 18, 2002.

BACKGROUND OF THE INVENTION

1. Field of the Invention

The present invention relates to a method and apparatus of sensing velocity, and, more particularly, to a method and apparatus for detecting rotational velocity and outputting a quadrature signal associated therewith.

2. Description of the Related Art

Electronic devices are an increasing part of everyday life and they are presently integrated in a large number of products, including products traditionally thought of as mechanical in nature, such as automobiles. To bridge the gap between mechanical movement and electronic control, it is necessary to successfully integrate electronic and mechanical components. This gap is normally bridged by using devices such as sensors and actuators.

Position sensors are used to electronically monitor the position or movement of a mechanical component. The position sensor produces data that may be expressed as an electrical signal that varies as the position of the mechanical component changes. Position sensors are an important part of innumerable products, providing the opportunity for intelligent control of a mechanical device.

Various contact-type sensors are known. For example, potentiometers are used, which detect a change in electrical signal due to a physical change in position of a wiping contact on an electrical resistive element. Rotational position movement can be detected by coupling a shaft of a potentiometer to the shaft of a rotating mechanical component. Linear movement can be detected either using a linear potentiometer or a rotating potentiometer that is coupled to a linear-moving component using pulleys and a string or a belt to translate a linear motion to rotational motion. A problem with this type of sensor is the physical wearing of the contacting parts. The wiping contact and the resistive element can cause a drift in the electrical signal, which induces errors and may lead to ultimate failure of the device.

Magnetic velocity sensors are generally a non-contact type of sensor and consist of a magnetic field sensing device, which is usually stationary, and a magnet is attached to a moving component. As the magnet approaches the sensing device, the magnetic field of the magnet is detected and the sensing device generates an electrical signal that is then used for counting, displaying, recording and/or control purposes. A problem with such sensors is that they depend on a movement of the magnet that is attached to a moving part, which is usually a costly approach.

A magnetic positional sensor developed by one of the inventors, patented as U.S. Pat. No. 4,970,463, and entitled "TEMPERATURE STABLE PROXIMITY SENSOR WITH SENSING OF FLUX EMANATING FROM THE LATERAL SURFACE OF A MAGNET," discloses a Hall effect device disposed along a surface of a magnet. The magnetic field produced by the magnet is altered by the passing of a ferrous object, the alteration being detected by the Hall effect device.

A quadrature signal is generally desired to provide velocity and directional information in the form of two oscillating signals that are out of phase with each other. The phase difference between the two signals is utilized to provide directional information, i.e., a forward and reverse direction. The frequency of each of the two quadrature signals is directly proportional to the velocity of the measured component.

Current quadrature sensors generally consist of two sensors that are spaced apart a known distance in an assembly. Mechanical stack up tolerances can cause errors which effect the quality of the signal. When a single assembly is used to space the two sensors a specific distance apart to reduce tolerance problems, the assembly becomes very costly.

A problem with rotating sensors is that they often require a stationary and a movable portion within a single assembly.

Another problem is that a quadrature signal from sensors usually require two separate, spaced apart sensors.

What is needed in the art is a compact modular velocity sensor, which will provide a quadrature signal from a single module.

SUMMARY OF THE INVENTION

The present invention provides a quadrature output sensor from a single modular component.

The invention comprises, in one form thereof, a sensor system including a sensor having at least one magnet and a plurality of magnetic flux responsive devices fixedly adjacent to the at least one magnet. Each of the plurality of magnetic flux responsive devices have a primary sensing plane, at least two of the primary sensing planes being offset from each other. A quadrature normalization circuit is communicatively connected to the sensor.

An advantage of the present invention is that a singular modular provides a quadrature output signal.

Another advantage of the present invention is that the quadrature signal is normalized to be electrically 90° degrees out of phase.

Yet another advantage of the present invention is that a quadrature signal is produced from a single unit, mounted at one position.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE PRESENT INVENTION

Referring now to the drawings, and particularly to FIGS. 1–4, there is shown a quadrature output system 10 embodying the present invention, including power system 12, ferrous target 14, sensor assembly 16, and conversion apparatus 41. Power system 12 includes a structural member 20 and a shaft 22. Structural member 20 positions sensory assembly 16 relative to target 14 and provides a rotational support for shaft 22. Power system 12 may be an automobile engine or transmission system having a rotational component therein.

Figure 1:
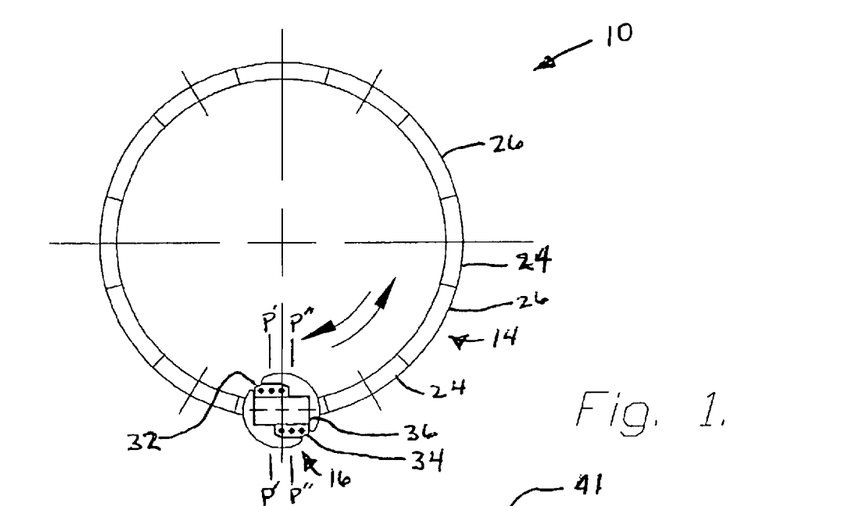
FIG. 1 is a top view of a quadrature output sensor embodying the present invention.
Figure 3:
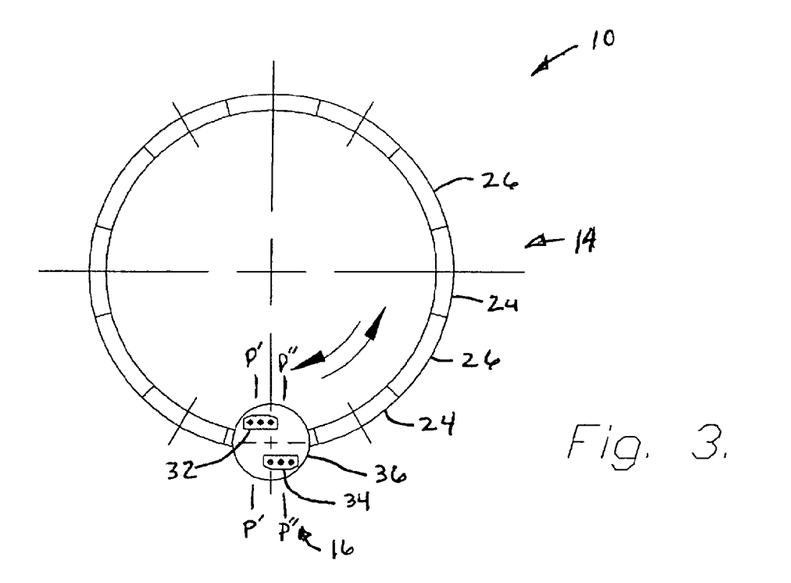
FIG. 3 is a top view of another embodiment of the quadrature output sensor of the present invention.
Figure 4:
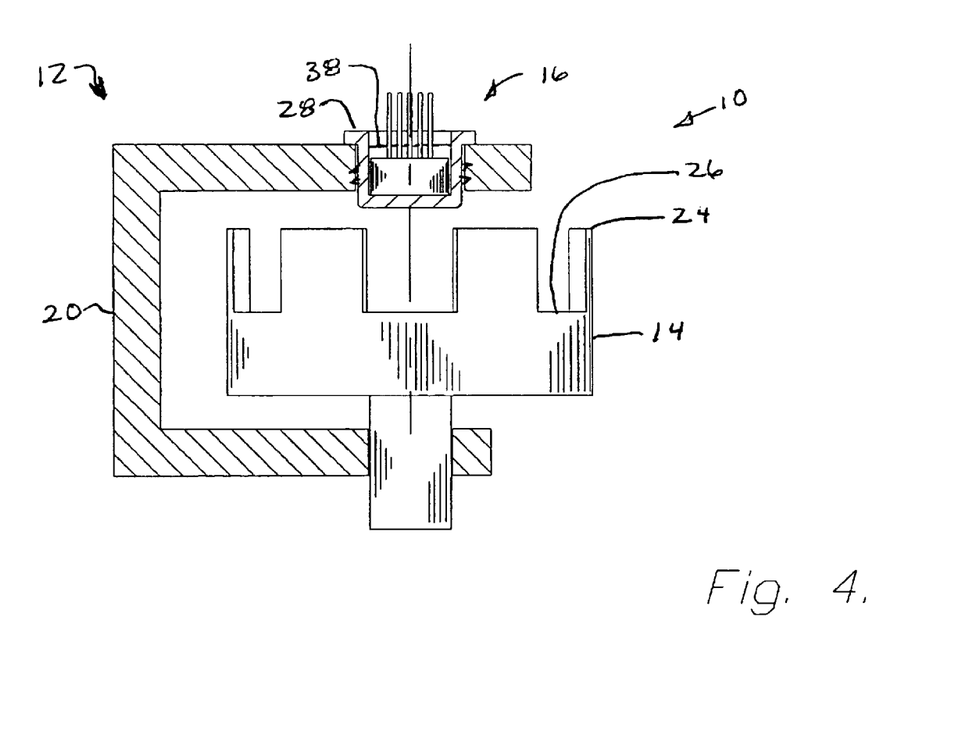
FIG. 4 is a partial cross-sectional view of the quadrature output sensor of FIG. 3 associated with a power transmission device.

Target 14 includes raised portions 24 and recessed portions 26, which are alternatingly positioned along target 14. Even though target 14 is illustrated as having uniformly spaced and square-shaped raised portions 24, angular and/or irregularly-spaced portions may also be utilized in a target 14. Additionally, even though target 14 and sensor assembly 16 are positioned in a particular manner in the figures, sensor assembly 16 may be positioned within an interior portion of target 14 or radially from target 14. Sensor assembly 16 includes a threaded mounting housing 28, connector 30, a first magnetic flux responsive device 32, a second magnetic flux responsive device 34, magnet 36, and encapsulant 38. Threaded housing mount 28 is engaged in structural member 20 in a removable manner. Threaded mount 28 additionally will include an orientation indication thereon in order that sensor assembly 16 may be properly positioned in structural member 20. Connector 30 provides electrical interface to a quadrature signal normalization circuit 41. Magnetic flux responsive devices 32 and 34 may be positioned on opposite sides of magnet 36, as shown in FIG. 1, or alternatively, magnetic flux responsive devices 32 and 34 may be substantially surrounded by magnet 36, such as a magnetic cup into which devices 32 and 34 are inserted, as shown in FIG. 3. The positioning of magnetic flux responsive device 32, relative to magnetic responsive device 34, is such that a sensing plane P' and P" respectively are offset from each other. The purpose of the offset between magnetic flux responsive devices 32 and 34 is to allow for a positional difference so that the detection of a ferrous target will produce two signals, which are out of phase from each other. Encapsulant 38 is provided to seal magnetic flux responsive devices 32 and 34, and magnet 36 within threaded housing mount 28.

Figure 2:
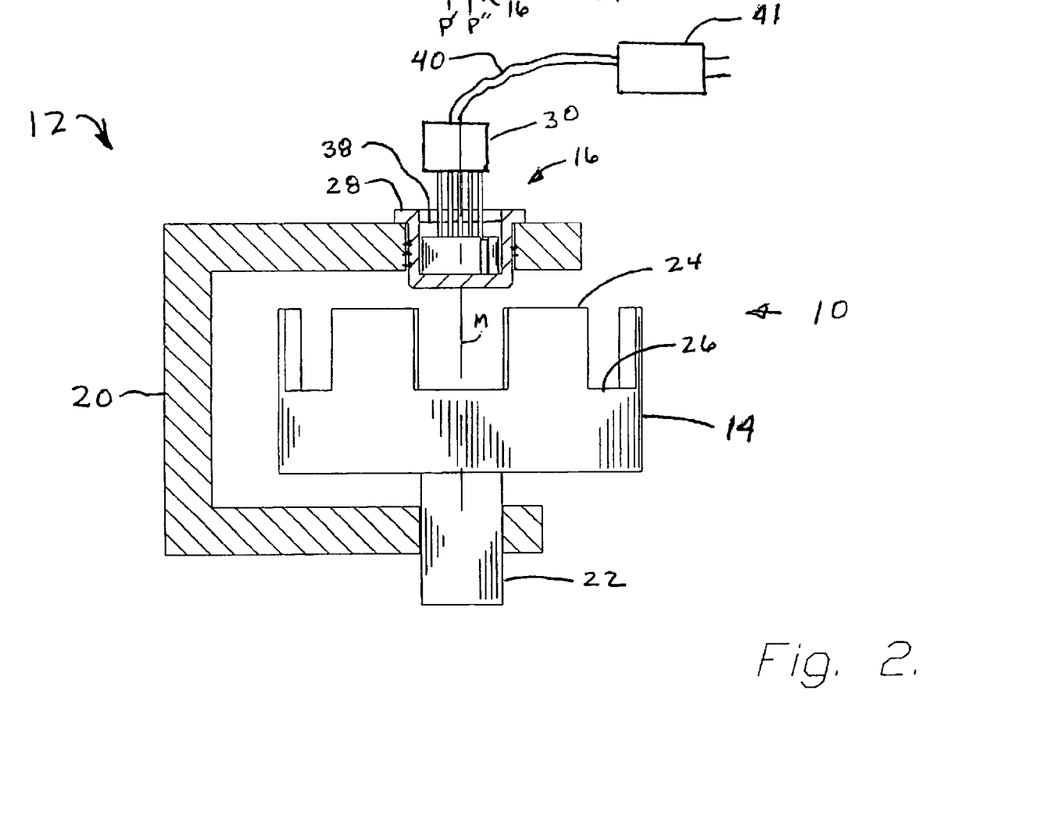
FIG. 2 is a partial cross-sectional view of a power system, including the quadrature output sensor of FIG. 1.

Planes P' and P" are substantially parallel to a magnetic axis M of magnet 36. Magnetic axis M of magnet 36 is shown in FIG. 2 and is into the plane of FIG. 1 and from top to bottom in the view of FIG. 2. The poles of magnet 36 would be directed generally opposite each other along magnetic axis M. Magnetic flux responsive devices 32 and 34 are positioned proximately at the midpoint of magnet 36 along magnetic axis M of magnet 36. Although devices 32 and 34 may be larger than magnet 36 and magnet 36 will be arranged along a surface of devices 32 and 34. Further, planes P' and P" are substantially parallel to each other in the preferred embodiment of the invention. An orientation indication on housing 28 relates to the direction of planes P' and P" so that sensor assembly 16 can be most effectively mounted in structural member 20. Even if sensor assembly 16 is not properly aligned, normalization circuit 41 detects a slight phase difference and produces a normalized output.

Figure 5:
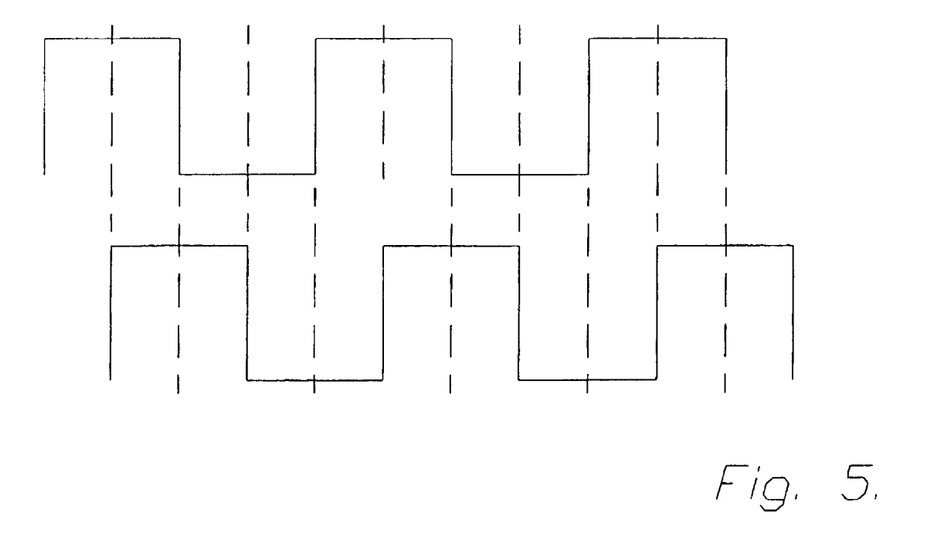
FIG. 5 is a square wave quadrature output signal, output from one of the embodiments of the present invention.
Figure 6:
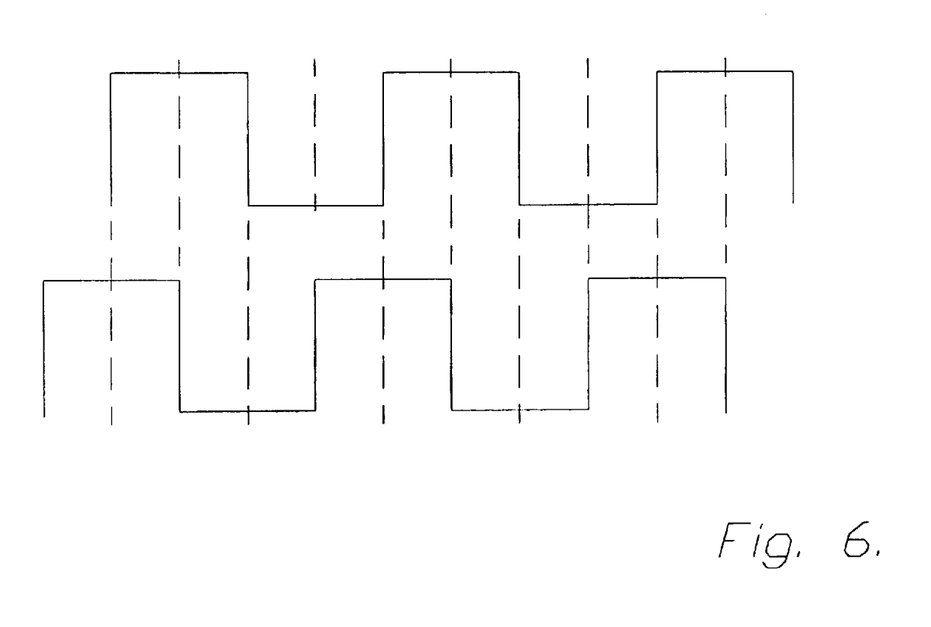
FIG. 6 is another quadrature output signal of the present invention, indicating an opposite direction as to that depicted in FIG. 5, due to a difference in the phase.
Figure 7:
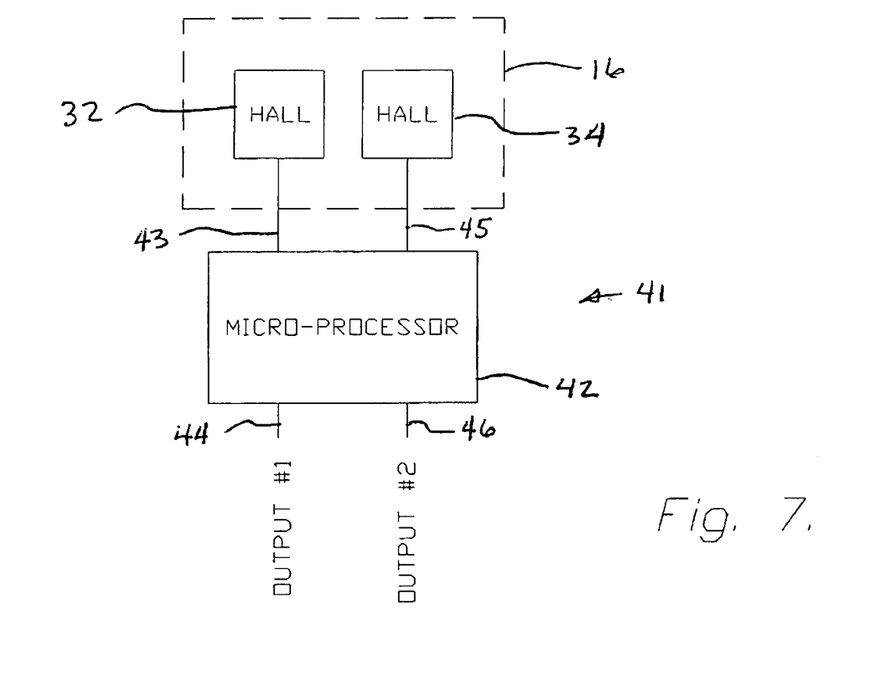
FIG. 7 is a schematical view of a processing portion of the present invention.
Figure 8:
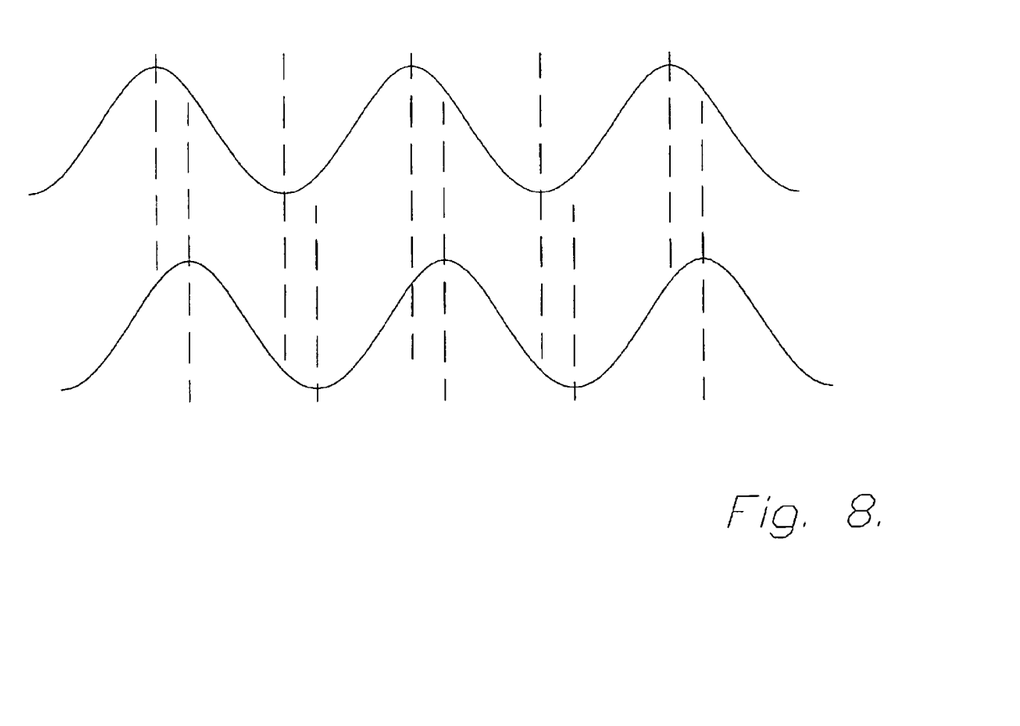
FIG. 8 is an analog quadrature output signal from a quadrature output device of the present invention.
Figure 9:
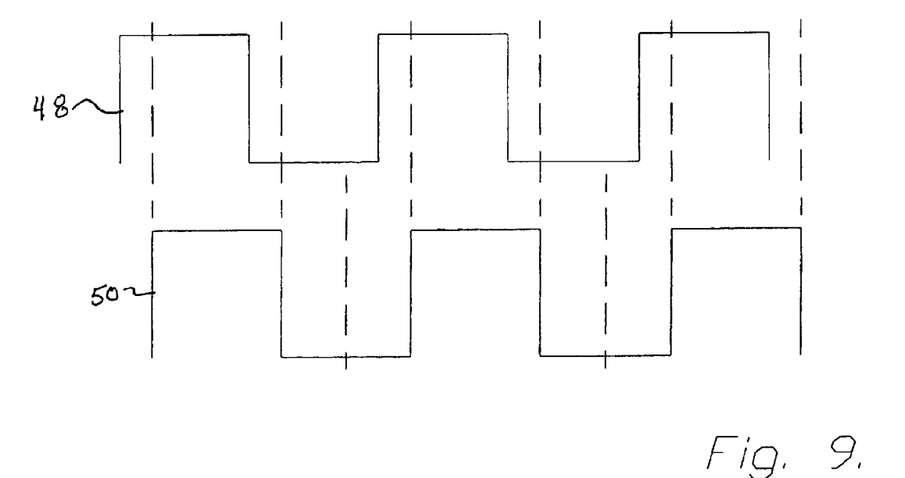
FIG. 9 is a digital quadrature output signal from the sensor of the present invention.
Figure 10:
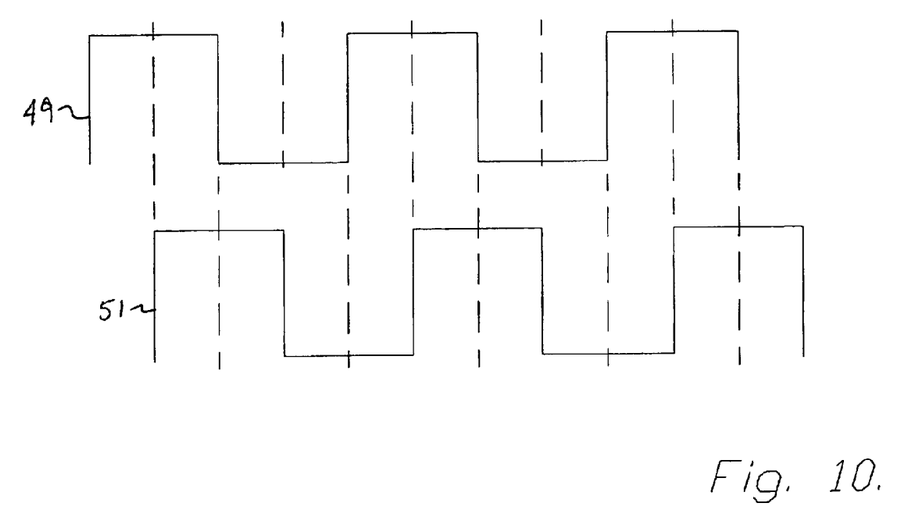
FIG. 10 is a normalized quadrature output signal produced by the quadrature normalization circuit of FIG. 7 from either the input signal described in FIG. 8 or FIG. 9.

Now, additionally referring to FIGS. 5 through 12, there are shown several signals and a normalization circuit. The electrical signals of FIGS. 5 and 6 represent 90° out-of-phase quadrature signals of opposite directional rotations between FIGS. 5 and 6. FIGS. 8 and 9 illustrate a quadrature output signal that may be typical of what is output from sensor assembly 16. The positional shift of magnetic flux responsive devices 32 and 34, relative to each other, detect the physical presence of a raised portion 24 of target 14 at slightly different points in time due to this physical offset. The result is an electrical offset in the signal produced from sensor assembly 16. If magnetic flux responsive devices 32 and 34 provide an analog output, a typical signal may be as shown in FIG. 8. If magnetic flux responsive devices 32 and 34 output a digital signal, the quadrature signal of FIG. 9 will be output therefrom. The quadrature signals shown in FIGS. 8 and 9 represent an out-of-phase set of electrical signals, but not 90° out of phase, which is required for some applications. Nonetheless, the output from sensor assembly 16 provides directional information by providing the out-of-phase nature of the two signals, which represent the direction of rotation of target 14. This is useful information that can be utilized to determine, for example, if a vehicle is backing or moving in a forward direction. Information from this signal can then be utilized to energize backup lights on a vehicle or to sound a backup warning, in the form of audible and visual signals. The frequency of signals in FIGS. 8 and 9 is directly proportional to the rotational velocity of target 14. As such, the rotational velocity of shaft 22 is likewise known, which can provide speed information to a speedometer or tachometer. Additionally, the information provided from sensor assembly 16 may be utilized to control other systems such as a transmission shifting apparatus and provide information to other control functions in a moving vehicle or in a rotating piece of machinery.

Figure 11:
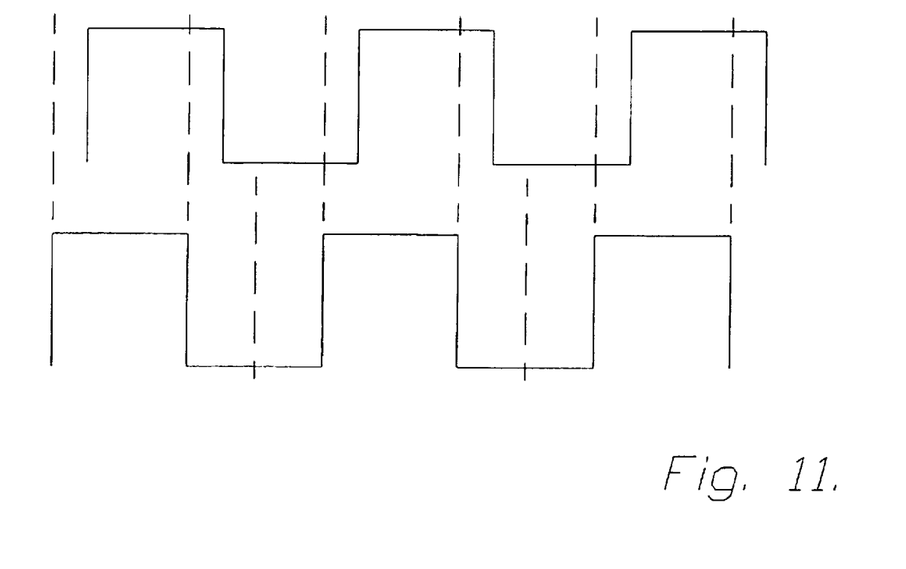
FIG. 11 is another quadrature output signal from an embodiment of a sensor of the present invention.
Figure 12:
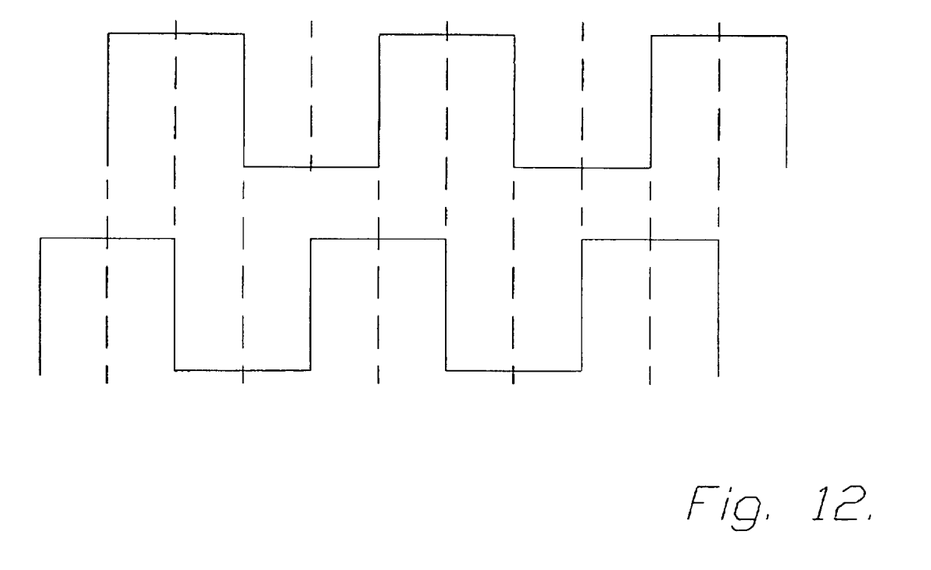
FIG. 12 is a normalized quadrature output signal output from the normalization circuit of FIG. 7, utilizing the input signal of FIG. 11.

Normalization circuit 41 includes a circuit capable of logical functions and/or mathematical computations, such as a microprocessor 42 and output lines 44 and 46. The output from Hall devices 32 and 34 is received by microprocessor 42 with the two signals slightly out of phase, which may be as those signals shown in FIG. 8 or FIG. 9. Microprocessor 42 may be a microcontroller 42, such as a P.I.C. 12C509A microcontroller manufactured by Microchip Technology, Inc. Microcontroller 42 detects a signal edge 48, such as that in FIG. 9, and outputs a signal on output line 44, such as rising edge 49 in FIG. 10. Signal edge 50 in FIG. 9 is detected and is delayed by microcontroller 42 to be output as normalized signal edge 51 in FIG. 10. Thus, resulting in two electrical signals that are substantially 90° out of phase. Whereas the velocity of target 14 can change quickly, the speed of change is relatively slow compared to the detecting capability of sensor assembly 16. As such, microcontroller 42 constantly monitors the frequency of the input signals, shown in FIG. 8 and/or FIG. 9, to thereby determine the frequency thereof. Microcontroller 42 determines the frequency by actually determining the period of one cycle of the wave form in the form of a count. As such, microcontroller 42, to a high degree of certainty, knows the frequency of the signal and thereby delays outputting normalized signal edge 51 in FIG. 10 to thereby produce a quadrature signal having substantial symmetry and having a 90° out-of-phase electrical quadrature signal, which is an ideal output and necessary in many requirements. In a like manner, when the quadrature signal is out of phase in the other direction, as shown in FIG. 11, the rising signal is delayed to provide a 90° out-of-phase signal. One embodiment of a program to implement the normalization of quadrature signal follows:

```
local STATUS=03h, FSR=04h, INDF=00h, GP=06h, STAT=07h,
CNT1L=08h, CNT1U=09h
  local CNT2l=0Ah, CNT2U=0Bh, ST=0Eh, ST2=0Fh
  local OW14L=10h, OW14U=11h, OW12L=12h, OW12U=13h
  local OW34L=14h, OW34U=15h
  goto 21h
falling btfsc    ST2, 1          ;falling edge turn off OW1
  retlw 0
  bcf      GP, 4            ;clear output
  rrf      CNT1L, 1
  movf     CNT1L, 0
  movwf    OW12L
  movwf    OW34L
  bcf      STATUS, 0
  rrf      CNT1L, 1
  movf     CNT1L, 0
  movwf    OW14L
  addwf    OW34L, 1
  clrf     CNT1L            ;clr count
  decf     CNT1L, 1
  btfss    ST2, 2           ;phase = 0
  bcf      STAT, 0
  btfsc    ST2, 2           ;phase = 1
  bsf      STAT, 0
  retlw 0
togl     btfss    ST2, 1    ;falling edge turn off OW1
  call     falling
  retlw 0
icnt1    macro
  incf     CNT1L, 1
  endm
e14      ;movf    OW14U, 1
  btfss    STAT, 0
  bcf      GP, 0
  btfsc    STAT, 0
  bsf      GP, 0
  retlw 0
e34      ;movf    OW34U, 1
  btfss    STAT, 0
  bsf      GP, 0
  btfsc    STAT, 0
  bcf      GP, 0
  retlw 0
dow14    macro
  decf     OW14L, 1
  btfsc    STATUS, 2
  call     e14
  endm
dow12    macro
  decf     OW12L, 1
  btfsc    STATUS, 2
  bsf      GP, 4
  endm
dow34    macro
  decf     OW34L, 1
  btfsc    STATUS, 2
  call     e34
  endm
  movlw    0Eh ;configure
```

```
tris     GP  ;0–3 inputs, 4&5 outputs
movlw    0xFF
movwf    OW14L
movwf    OW14U
movwf    OW12L
movwf    OW12U
movwf    OW34L
movwf    OW34U
clrf     CNT1L
clrf     CNT1U
clrw
movf     GP, 0
movwf    ST
BEGIN    icnt1            ;incr cnt
dow14
dow12
dow34
movf     GP, 0            ;read IO
movwf    ST2 ;store
xorwf    ST, 1            ;xor
btfsc    ST, 1
call     falling
movf     ST2, 0
movwf    ST
goto     BEGIN
end
```

The number of programming steps utilized to perform a certain function is known and taken into consideration in determining the timing of turning on normalized signal edge 51. Even though only one rising edge of the quadrature signal has been discussed, the falling edges are in a like manner compensated for in the normalized quadrature output signal.

Figure 13:
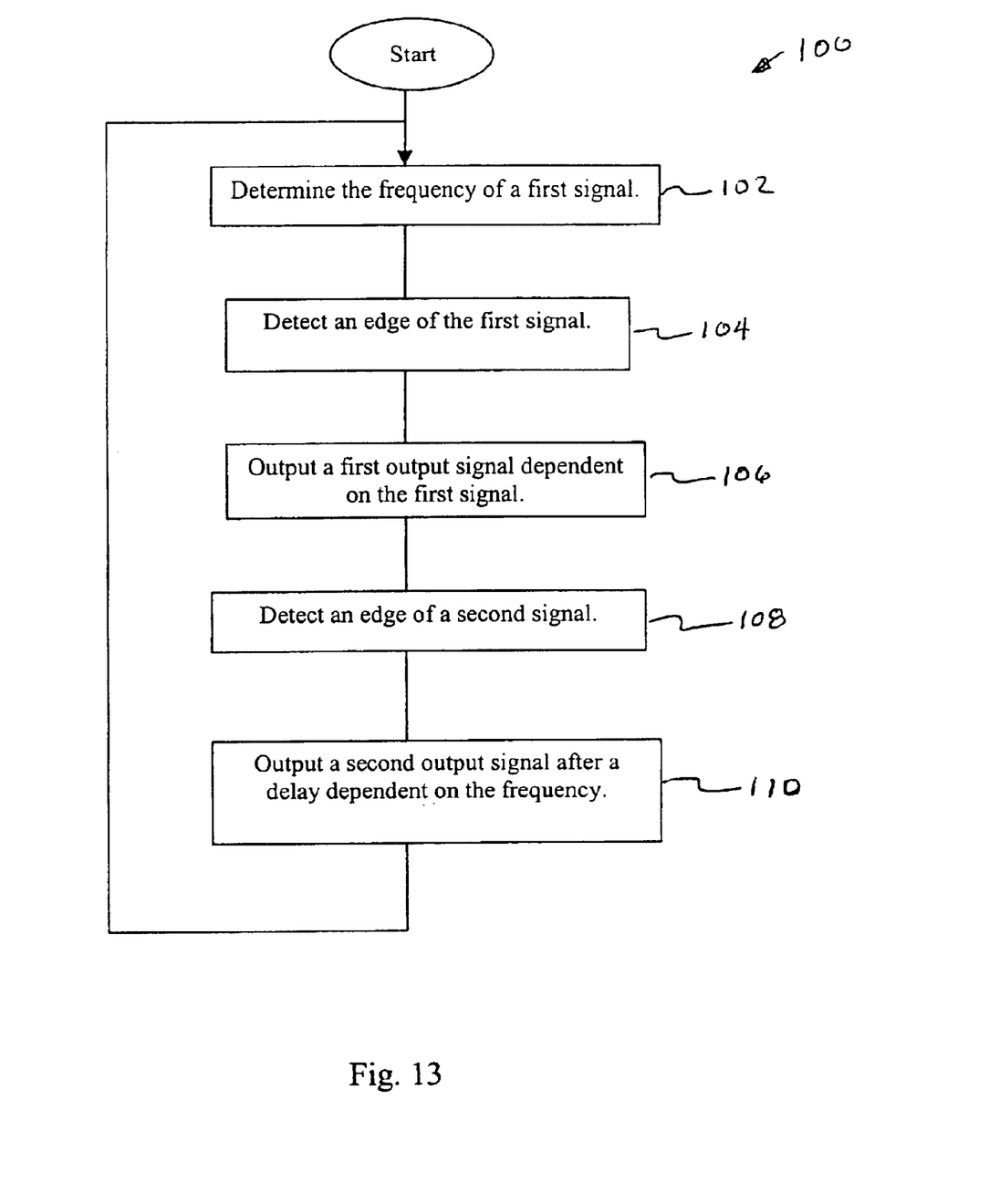
FIG. 13 is a flow diagram of an embodiment of a method to normalize a quadrature signal.

Now, additionally referring to FIG. 13, there is illustrated a method 100 to normalize a quadrature signal. The term 'normalize a quadrature signal' means to produce a quadrature signal from inputs, the signal being two electrical signals that are similar in frequency and waveform, but offset from each other by approximately ¼ of the wavelength of the waveform. Method 100 is initiated at step 102, where the frequency of an input signal on line 43 is determined.

At step 104, an edge of input signal 48 is detected by it's change in voltage. The input signal comes from sensor assembly 16.

At step 106, an output signal is sent on line 44 in response to the detection of the input signal edge detected at step 104.

At step 108, a signal edge 50 is detected by it's change in voltage. The input signal comes from sensor assembly 16 on line 45.

At step 110, an output signal is sent on line 46 dependent on the detection of signal edge 50 and having been delayed from the output signal on line 44 approximately ¼ of the wavelength of the detected frequency.

Method 100 repeats itself to produce a continuous or quasi-continuous normalized quadrature signal.

Additionally, circuit 41 produces an output that indicates the direction of movement of target 14. The output is in the form of an electrical signal that may be utilized by other systems. Circuit 41 may be integral with sensor assembly 16 so that a single module provides a normalized quadrature output. Further, sensor assembly 16 may be used by a system in which redundant outputs are desired without utilizing the quadrature signal feature.

Further processing by microcontroller 42 may be done to provide an alternate output, such as a signed digital value relating to the speed and direction, one signal relating to the velocity and another relating to the direction of rotation, or adding another piece of information to the signal such as the temperature detected by the sensor. In an alternate configuration a temperature sensing device, such as a thermistor is included in sensor assembly 16. The temperature detected by the sensor can be sent on a separate line or it may be included on a digital line that otherwise reports the direction of movement. For example, if a high digital level of 2.5 volts indicates a forward direction, then a voltage that is higher than that can be output to additionally indicate the temperature. In this way forward motion and the temperature can be conveyed on one data line. Of course a reverse direction of 0 volts, digital low, would not be able to convey the temperature.

While housing 28 has been illustrated to house only sensor assembly 16, housing 28 may additionally house circuit 41. This arrangement allows the formation of an integral unit that may produced and supplied as a single stock item.

While this invention has been described with respect to preferred embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sensor system, comprising:
   a sensor including:
      at least one magnet; and
      a plurality of magnetic flux responsive devices fixedly adjacent to said at least one magnet, each of said plurality of magnetic flux responsive devices having a primary sensing plane, at least two primary sensing planes being offset from each other; and
   a quadrature normalization circuit communicatively connected to said sensor.

2. The system of claim 1, wherein said plurality of magnetic flux responsive devices include a first magnetic flux responsive device and a second magnetic flux responsive device, said first magnetic flux responsive device fixed proximate a side of said at least one magnet, said second magnetic flux responsive device fixed proximate another side of said at least one magnet.

3. The system of claim 1, wherein said at least one magnet substantially surrounds said plurality of magnetic flux responsive devices.

4. The system of claim 1, further comprising a housing, at least one of said at least one magnet with said plurality of magnetic flux responsive devices and said quadrature normalization circuit substantially positioned within said housing.

5. The system of claim 4, wherein said at least one magnet and said plurality of magnetic flux responsive devices are encapsulated within said housing.

6. The system of claim 1, wherein said plurality of magnetic flux responsive devices each output a signal similar in frequency to each other including a first signal and a second signal, said first signal out of phase with said second signal.

7. The system of claim 6, wherein said first signal is approximately 90° out of phase with said second signal.

8. The system of claim 1, wherein said normalization circuit receives a signal from each of said plurality of magnetic flux responsive devices including a first signal and a second signal, said normalization circuit outputs a signal dependent on a frequency of said first signal, an event in said first signal and an event in said second signal.

9. The system of claim 8, wherein said normalization circuit further outputs a fourth signal dependent on said first signal.

10. The system of claim 1, further comprising a ferrous target having protrusions thereon, said ferrous target located proximate to said sensor, said protrusions directed toward said sensor.

11. The system of claim 1, wherein said quadrature normalization circuit outputs at least one of a quadrature signal, a digital number, a velocity signal and a direction signal.

12. A sensor, comprising:
   at least one magnet; and
   a plurality of magnetic flux responsive devices fixedly adjacent to said at least one magnet, each of said plurality of magnetic flux responsive devices having a primary sensing plane, at least two primary sensing planes being offset from each other, said at least one magnet substantially surrounding said plurality of magnetic flux responsive devices.

13. The sensor of claim 12, wherein said plurality of magnetic flux responsive devices include a first magnetic flux responsive device and a second magnetic flux responsive device, said first magnetic flux responsive device separated from, said second magnetic flux responsive device.

14. The sensor of claim 12, wherein said at least one magnet is a magnetic cup.

15. The sensor of claim 12, wherein said plurality of magnetic flux responsive devices each output a signal similar in frequency to each other including a first signal and a second signal, said first signal out of phase with said second signal.

16. The sensor of claim 15, wherein said first signal is approximately 90° out of phase with said second signal.

* * * * *